United States Patent
Takemura et al.

[11] Patent Number: 6,066,068
[45] Date of Patent: May 23, 2000

[54] TOROIDAL TYPE CONTINUOUSLY VARIABLE TRANSMISSION

[75] Inventors: Hiromichi Takemura; Nobuaki Mitamura, both of Fujisawa, Japan

[73] Assignee: NSK, Ltd., Tokyo, Japan

[21] Appl. No.: 09/183,630

[22] Filed: Oct. 30, 1998

[30] Foreign Application Priority Data

Nov. 4, 1997 [JP] Japan .................................. 9-302046

[51] Int. Cl.[7] .................................................. F16H 15/38
[52] U.S. Cl. .............................................. 476/40; 384/912
[58] Field of Search ............................. 476/40; 420/123; 384/569, 907, 912

[56] References Cited

U.S. PATENT DOCUMENTS

| | | | |
|---|---|---|---|
| 5,456,766 | 10/1995 | Beswick et al. ................. | 420/123 |
| 5,556,348 | 9/1996 | Kokubu et al. ................. | 476/40 |
| 5,830,285 | 11/1998 | Katayama et al. ............. | 420/123 |

OTHER PUBLICATIONS

Article from a tribology conference held in Morioka entitled "Rolling Life under Bending Stress," *Japanese Society of Tribologists*, Oct. 1992.

*Primary Examiner*—David A. Bucci
*Assistant Examiner*—Chong H. Kim
*Attorney, Agent, or Firm*—Christensen O'Connor Johnson & Kindness PLLC

[57] ABSTRACT

A power roller bearing and input and output disks are made of a material containing 0.15 to 0.5 wt %, 0.15 to 1.5 wt %, and 0.1 to 1.5 wt % of C, Si, and Mo, respectively, and 9 ppm or less of oxygen. At least one component selected from the group consisting of the inner and outer rings and the input and output disks is subjected to carbonitriding, hardening, tempering and grinding, such that a finished surface hardness has a Vickers hardness of Hv720 or more and the hardness at a depth of Dx from the surface is Hv650 or more. The Dx is a critical equivalent stress generation position in a synthetic stress distribution and meets Dx=3.0 Zo to 5.0 Zo where Zo is a maximum dynamic shearing stress generation position from the surface.

3 Claims, 4 Drawing Sheets

TOROIDAL TYPE CONTINUOUSLY VARIABLE TRANSMISSION

BACKGROUND OF THE INVENTION

The present invention relates to a toroidal type continuously variable transmission and, more particularly, to an improvement of a toroidal type continuously variable transmission for a vehicle such as an automobile.

Conventionally, gear type variable transmissions have been used most frequently as vehicle variable transmissions. As gear steels for forming gears, low-alloy steels such as SCr420 and SCM420 are used among other machine structural steels and alloy steels defined by JIS G4051 to G4202. Such machine structural steels as materials are formed into the shapes of gears and subjected to a surface hardening treatment such as cementation or nitriding. However, conventional gear type (automatic) step variable transmissions are discontinuously variable transmission mechanisms. Therefore, a loss is produced during the transmission of power, or a shift shock is generated.

On the other hand, continuously variable transmissions produce no intermittent shift shocks. Accordingly, continuously variable transmissions are superior to gear type step variable transmissions in power transmission characteristics and have high fuel consumption efficiency. For this reason, various researches have been made recently to incorporate continuously variable transmissions in actual automobiles, and belt type continuously variable transmissions are put to use in some automobiles.

One of these continuously variable transmissions is a toroidal type continuously variable transmission including input and output disks and a power roller bearing. This toroidal type continuously variable transmission can transmit higher torque than a belt type continuously variable transmission and hence is considered to be effective as a continuously variable transmission for medium- and large-sized automobiles. Therefore, the development of a high-durability material which can transmit high torque and does not break even at high temperatures is being sought.

Conventional high-durability materials for this toroidal type continuously variable transmission are as follows. That is, as disclosed in Jpn. Pat. Appln. KOKAI Publication No. 7-208568, rolling elements of a power roller bearing as a toroidal type continuously variable transmission component are made of medium or high carbon steel and subjected to carbonitriding, hardening, and tempering. Also, as described in Jpn. Pat. Appln. KOKAI Publication No. 9-79336, machine structural steel containing Cr is used as the material of rolling elements of a toroidal type continuously variable transmission, and the rolling elements are carbonitrided to meet the following conditions. That is, the N amount in the rolling element is 0.2 to 0.6 wt %. At depth $d \leq 0.2$ Zst where Zst is the depth at which the maximum shearing stress is produced inside the rolling element due to surface contact, the C+N amount is 0.9 to 1.3 wt %, the residual austenite amount is 20 to 45 vol %, and the hardness is Hv500 or more. Additionally, at a depth satisfying $0.5$ Zst$\leq d \leq 1.4$ Zst, the C+N amount is 0.6 wt %$\leq$C+N$\leq$1.2 wt %, and the hardness is Hv700 or more.

When a conventional toroidal type continuously variable transmission is driven, a high contact pressure is produced between the input and output disks and the power roller bearing (i.e., on the traction surface of the power roller). Consequently, a high thrust load acts on the power roller bearing, so a rolling contact load similar to that of a roller bearing acts on the bearing. These contact pressure and thrust load produce a high load which is not produced in common rolling bearings. In particular, the traction surface or bearing surface of the power roller readily peels or breaks. This makes the rolling life of power roller bearing surface impossible to prolong. For example, in a toroidal CVT, the contact surface pressure of a traction power transmitter at the maximum torque and minimum speed is Pmax=3.9 GPa (when contact-ellipse major-axis radius a=5 mm and contact-ellipse minor-axis radius b=1.3 mm, maximum dynamic shearing stress generation position; Zo=0.48 b, and maximum static shearing stress generation position; Zst= 0.72 b).

Compared to common rolling bearings, a toroidal type continuously variable transmission has its characteristic and serious problem; since the backup stiffness is low unlike in a bearing, repeated bending stress is applied to the power roller, input disk, and output disk to produce high tensile stress (it is found from FEM calculations and results of measurements using a strain gauge that a tensile stress of approximately 90 kgf/mm$^2$ is produced on the traction surface at the maximum load and minimum speed), so cracks are easily formed from these portions as start points. This makes the fatigue crack resistance impossible to increase (FIGS. 3 and 4). As a series of researches on these problems, rolling life under bending stress is reported (Manuscripts for Japan Tribology Conference, Morioka, 1992-10, pp. 793 to 796). This reference describes that the life is significantly shortened when rolling contact stress and bending stress are combined.

As shown in FIGS. 3 and 4, therefore, the combination of large repeated shearing stress and large repeated bending stress acts on the power roller bearing of this toroidal type continuously variable transmission, resulting in a severe stress loaded state unlike in general-purpose rolling bearings. For example, as shown in FIG. 5, the maximum stress generation position becomes deeper from a conventional peak value P1 to a value P2. Accordingly, simply performing cementation which is considered to be effective to improve the peeling resistance of general-purpose rolling bearings is insufficient to prolong the life of bearings.

In a toroidal type continuously variable transmission, unlike general-purpose rolling bearings, heat is generated when large traction power is transmitted by the input and output disks and the power roller traction surface. The temperature of the contact point is expected to be higher than 200° C., so any conventional bearing material cannot be used. Hence, the amount of alloy element Mo which maintains its hardness even at high temperatures or the amount of alloy element Si which delays readily occurring tissue change are specified.

In Jpn. Pat. Appln. KOKAI Publication No. 9-79336 described above, carbonitriding is performed to set the N amount in the rolling element to 0.2 to 0.6 wt %. At depth $d \leq 0.2$ Zst where Zst is the depth at which the maximum shearing stress is produced inside the rolling element due to surface contact, the C+N amount is 0.9 to 1.3 wt %, the residual austenite amount is 20 to 45 vol %, and the Vickers hardness is Hv500 or more. Additionally, at a depth satisfying $0.5$ Zst$\leq d \leq 1.4$ Zst, the C+N amount is 0.6 wt %$\leq$C+N$\leq$1.2 wt %, and the hardness is Hv700 or more. As indicated by Comparative Example 1 in FIG. 6, these specified values are considered to be effective only to the contact stress. That is, since the hardness near the surface is as low as Hv500, the specified hardness distribution is unsatisfactory for the disks to which the bending stress is further applied. Also, as indicated by Comparative Example 2 in FIG. 6, the depth of 0.5 Zst to 1.4 Zst at which the hardness is specified to Hv700 is set by taking only the rolling contact stress into consideration. Therefore, if the bending stress is combined, this specified hardness is insufficient. Furthermore, although the wear resistance improves when the surface N amount is 0.2 to 0.6 wt %, this surface N amount is too large and significantly deteriorates the processability. Note that the value of Vickers hardness Hv is approximately three times the value of yield stress $\delta_y$, and approximately six times the value of shearing stress $\tau$.

In Jpn. Pat. Appln. KOKAI Publication No. 7-208568, the rolling elements of the power roller bearing as one component of the toroidal type continuously variable transmission are made of medium or high carbon steel and subjected to carbonitriding, hardening, and tempering. The present invention further improves a material having sufficient durability even under recent severe high-torque conditions.

BRIEF SUMMARY OF THE INVENTION

It is an object of the present invention to solve the characteristic problem of a toroidal type continuously variable transmission that rolling fatigue peeling, breakage, and frictional wear occur in an inner and outer rings of power roller bearing input disk, and output disk, and provide a long-life toroidal type continuously variable transmission including long-life reliable input and output disks and power roller bearing which do not crack due to fatigue.

A toroidal type continuously variable transmission comprising an input disk attached to an input shaft, an output disk attached to an output shaft, and a power roller bearing including an inner ring, an outer ring, and a plurality of rolling elements, the inner ring engaging with the input and output disks to transmit power from the input shaft to the output shaft, wherein at least one component selected from the group consisting of the inner and outer rings of the power roller bearing and the input and output disks is made of a material containing 0.15 to 0.5 wt %, 0.15 to 1.5 wt %, and 0.1 to 1.5 wt % of C, Si, and Mo, respectively, equal or not more than 9 ppm of oxygen, and another unavoidable impurity element, and the at least one component is subjected to carbonitriding, hardening, tempering and grinding, such that a finished surface C and N amounts are 0.8 to 1.2 wt % and 0.05 to 0.20 wt %, respectively, and the surface hardness has a Vickers hardness of equal or not less than Hv720, and hardness of the material at a depth of Dx from a surface is not equal to or less than Hv650, the Dx being a critical equivalent stress generation position in a synthetic stress distribution of a shearing stress distribution and a bending stress distribution and meeting Dx=3.0 Zo to 5.0 Zo where Zo is a maximum dynamic shearing stress generation position from the surface.

In the toroidal type continuously variable transmission according to the present invention, the inner and outer rings of the power roller bearing and the input and output disks are subjected to carbonitriding and a physical surface hardening treatment such as shot peening. This prevents peeling, breakage, and fatigue cracking of these members.

The reasons why the constituent elements of the present invention are limited will be described below.

1) Finished surface C amount: 0.8 to 1.2 wt %

After the power roller (inner ring), outer ring, input disk, and output disk are carbonitrided, hardened, tempered, and grinded, the finished surface C amount is specified to 0.8 to 1.2 wt % for the reasons explained below. That is, the surface C amount of 0.8 wt % or more is necessary to obtain sufficient hardness against rolling fatigue and sufficient strength against bending stress load. If the surface C amount exceeds 1.2 wt %, giant carbide is readily produced to form crack start points.

2) Finished surface N amount: 0.05 to 0.20 wt %

When the surface N amount is 0.05 wt % or more, the tempering resistance improves, and fine carbide disperses and separates out. This further improves the strength. If the surface N amount exceeds 0.20 wt %, the wear resistance improves to make polishing difficult to perform. Also, the brittle crack strength lowers.

3) Finished surface hardness: Hv720 or more

Hardness in position Dx: Hv650 or more

It is desirable to perform carbonitriding by which the surface hardness is a Vickers hardness of Hv650 or more and the hardness at a depth of Dx from the surface is Hv650 or more after hardening and tempering are performed. The depth of Dx corresponds to a critical equivalent stress generation position in a synthetic stress distribution of a shearing stress distribution and a bending stress distribution. Note that Dx=3.0 Zo to 5.0 Zo where Zo is a maximum dynamic shearing stress generation position from the surface.

As shown in FIGS. 3 and 4, the combination of large repeated shearing stress and large repeated bending stress acts on the components of a power roller bearing 8 of a toroidal type continuously variable transmission, resulting in a severe stress loaded state different from general rolling bearings. Accordingly, as shown in FIG. 5, the maximum stress generation position becomes deeper from the conventional peak value P1 to the value P2. This is because the hardness distribution is specified by performing carbonitriding by taking account of the synthetic stress load, instead of simply performing cementation which is considered to be effective to improve the peeling resistance of rolling bearings.

In a toroidal type continuously variable transmission, unlike common rolling bearings, heat is generated when large traction power is transmitted by the input and output disks and the power roller traction surface. The temperature of the contact point is expected to be higher than 200° C., so any conventional bearing material cannot be used. Hence, the amount of alloy element Mo which maintains its hardness even at high temperatures and the amount of alloy element Si which delays readily occurring tissue change are specified.

In Jpn. Pat. Appln. KOKAI Publication No. 9-79336 described above, carbonitriding is performed to set the N amount in the rolling element to 0.2 to 0.6 wt %. At depth $d \leq 0.2$ Zst where Zst is the depth at which the maximum shearing stress is produced inside the rolling element due to surface contact, the C+N amount is 0.9 to 1.3 wt %, the residual austenite amount is 20 to 45 vol %, and the hardness is Hv500 or more. Additionally, at a depth satisfying 0.5 Zst $\leq d \leq$ 1.4 Zst, the C+N amount is 0.6 wt % $\leq$ C+N $\leq$ 1.2 wt %, and the hardness is Hv700 or more. As indicated by Comparative Example 1 in FIG. 6, these specified values are considered to be effective only to the contact stress. That is, since the hardness near the surface is as low as Hv500, the specified hardness distribution is unsatisfactory for the disks to which the bending stress is further applied. Also, as indicated by Comparative Example 2 in FIG. 6, the depth of 0.5 Zst to 1.4 Zst at which the hardness is specified to Hv700 is set by taking only the rolling contact stress into consideration. Therefore, if the bending stress is combined, this specified hardness is inappropriate. Furthermore, when the surface N amount is 0.2 to 0.6 wt %, the wear resistance increases and the processability significantly lowers because this surface N amount is too large.

In the present invention, therefore, the depth Zo at which the maximum dynamic shearing stress acts is used in calculating the rolling life of each component.

The calculations of the position Zo where the maximum dynamic shearing stress acts will be described below.

Point contact between steels is given by $$a = (50.5 \times 10^{-3})\mu \cdot (P/\Sigma\rho)^{1/3} \quad (1)$$

$$a = (50.5 \times 10^{-3})\upsilon \cdot (P/\Sigma\rho)^{1/3} \quad (2)$$

$$b/a = \{(t^{2-1})(2t^{-1})\}^{1/2} = k_1 \quad (3)$$

$$\cos\tau = |\rho_{11} - \rho_{12} + \rho_{21} - \rho_{22}|/\Sigma\rho \quad (4)$$

where a is a contact-ellipse major-axis radius, b is a contact-ellipse minor-axis radius, $\tau$ is an auxiliary angle, $\mu$ and $\upsilon$ are constants pertaining to cos $\tau$, P is load, and $\Sigma\rho$ ($=\rho_{11}+\rho_{12}+\rho_{21}+\rho_{22}$) is the summation of principal curvatures which form a right angle at a contact point between two elastic members.

Note that $\mu$, $\upsilon$, $k_1$, and $k_2$ have the following relations:

$$\mu = \{2E(k_2)/\pi k_{12}\}^{1/3}$$
$$\upsilon = \{2E(k_2)k_1/\pi\}^{1/3}$$
$$k_1 = b/a$$
$$k_2 = (1-k_{12})^{1/2}$$

Hence, $\mu$ and $\upsilon$ are constants calculated by second kind complete elliptic integral.

When a and b calculated from equations (1) and (2), respectively, are substituted into equation (3) to solve the equation for a parameter t, the maximum dynamic shearing stress generation position Zo is given by equation (5) below. This is described in "Bearing Lubrication Manual (Nikkan Kogyo Shinbunsha, Bearing Lubrication Manual Editorial Committee ed., 1961)", pp. 230 to 240.

$$Zo = b\{(t+1)(2t-1)^{1/2}\}^{-1} \quad (5)$$

Zo can also be calculated by using maximum contact pressure Pmax from a relationship indicated by $$Pmax = [188 \times \{P(\Sigma\rho)^2\}^{1/3}]/\mu\upsilon \quad (6)$$

In the present invention, a critical equivalent stress generation region obtained by synthesizing a shearing stress distribution and a bending stress distribution on the basis of the Zo value calculated as above is specified as Dx=3.0 Zo to 5.0 Zo. In the present invention, this region is considered to be important to prevent rolling fatigue peeling, breakage, and fatigue cracking of the inner and outer rings of the power roller bearing, input disk, and output disk as the components of the toroidal type continuously variable transmission when the transmission is used.

To prevent these peeling and breakage, Hv650 or more is necessary in at least the position 3 Zo within the Dx range. As the load increases, the position where this hardness is necessary becomes deeper. Therefore, the hardness is more preferably Hv650 or more in the position 5 Zo. For this reason, the hardness in the position Dx is specified to Hv650 or more.

4) Residual stress in 0.5 Dx to Dx: −130 to −60 kgf/mm²

When shot peening (SP) is performed, media (e.g., steel balls) collide against the surface of a material to plastically deform the SP-treated material surface and its vicinity (to be also referred to as surface layer portions hereinafter) constructing individual portions. This produces residual compression stress. Accordingly, the fatigue resistance improves when the SP treatment is performed such that a residual compression stress of −60 kgf/mm² or more is produced with respect to the combination of rolling contact stress and high tensile stress applied to each portion. However, if the residual compression stress exceeds −130 kgf/mm², the effect is saturated, and the processing cost rises. In the present invention, the "residual compression stress" is residual stress with a negative sign. Therefore, the larger the absolute value of residual compression stress, the larger the residual compression stress; the smaller the absolute value of the residual compression stress, the smaller the residual compression stress.

To prevent peeling and breakage of the components of the toroidal type continuously variable transmission of the present invention, the residual compression stress must be −60 to −130 kgf/mm² in at least a depth of 1.5 Zo in the critical equivalent stress generation region Dx. As the load increases, the position where this residual compression stress is necessary becomes deeper. That is, this value is necessary at a depth of preferably 2.0 Zo, and more preferably 3.0 Zo.

The reasons why the compositions of material of the toroidal type continuously variable transmission of the present invention are limited will be described below.

5) C: 0.15 to 0.50 wt %

C must be 0.15 wt % in order to obtain stable cleanness of material for mass production containing little inclusions considered to shorten the life by breakage or peeling, and to shorten the treatment time of carbonitriding performed to obtain enough hardness against rolling fatigue. If C exceeds 0.50 wt %, the crack strength lowers in a central portion, and the dimensional stability degrades at high temperatures. For these reasons, C=0.15 to 0.50 wt % is specified.

6) Si: 0.15 to 1.50 wt %

Si has an effect of delaying white tissue change found under rolling fatigue and improves the hardenability. If Si is less than 0.15 wt %, no sufficient tempering softening resistance can be obtained. If Si exceeds 1.5 wt %, the processability significantly degrades. Therefore, Si=0.15 to 1.5 wt % is specified.

7) Mo: 0.1 to 1.5 wt %

Mo improves the tempering softening resistance and the bearing hardness by an effect of dispersing fine carbide, so 0.1 wt % or more of Mo is necessary. However, if Mo exceeds 1.5%, the effect of Mo is saturated, and the processability may degrade. So, Mo=0.1 to 1.5% is specified.

8) Oxygen: 9 ppm or less

Oxygen can produce oxide-based inclusions in steel to form start points (fisheyes) when bending stress fatigue takes place or can function as a nonmetallic inclusion which shortens the rolling life. Accordingly, the upper limit of oxygen is specified to 9 ppm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment of the present invention will be described below with reference to the accompanying drawing.

Figure 1:
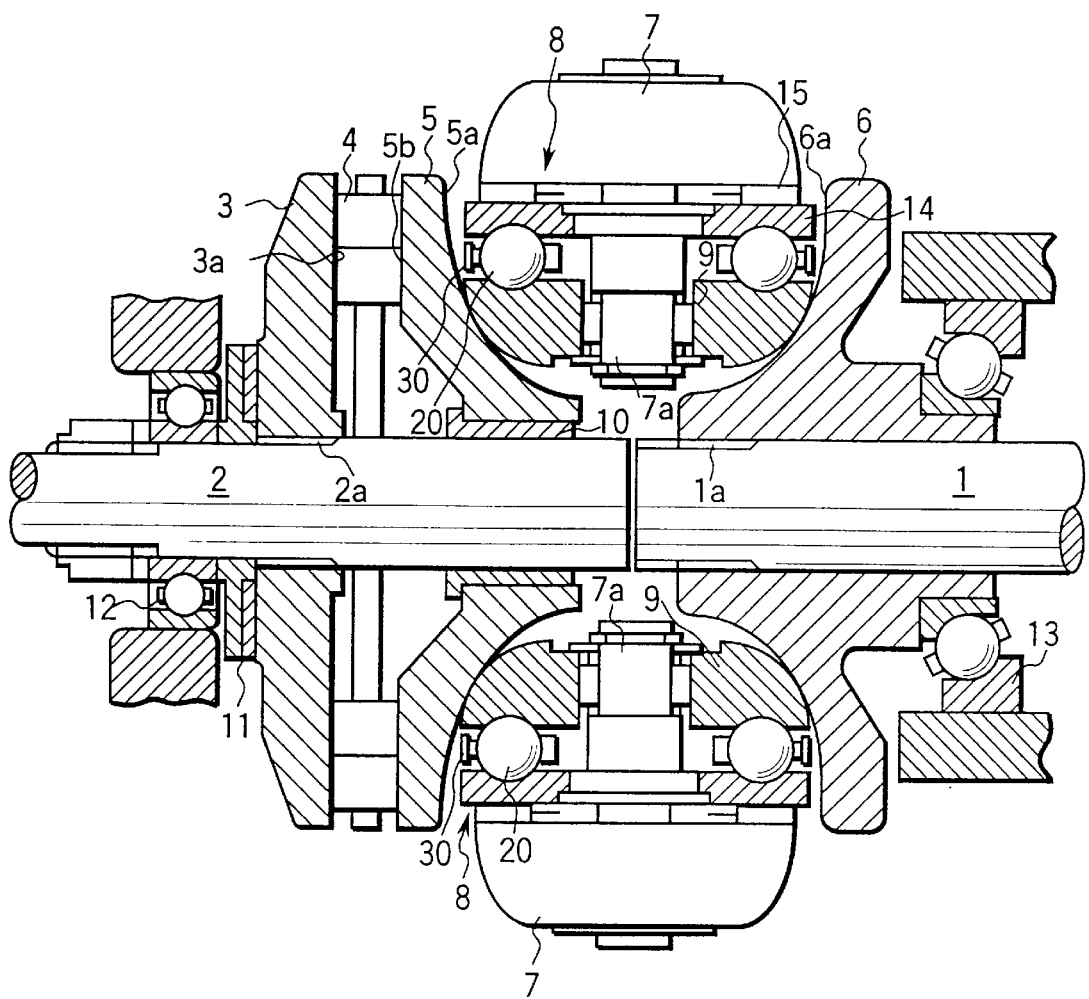
FIG. 1 is a longitudinal sectional view of a toroidal type continuously variable transmission.

FIG. 1 shows the longitudinal sectional structure of a toroidal type continuously variable transmission. Reference numerals 1 and 2 denote output and input shafts, respectively. An input disk 5 is rotatably and loosely fitted on the input shaft 2 via a bush 10. A cam disk 3 is fixed to the input shaft 2 by a spline 2a. Cam surfaces 3a and 5b are formed on the opposing surfaces of the cam disk 3 and the input disk 5, respectively. Rollers 4 are sandwiched between the cam surfaces 3a and 5b. An output disk 6 is fixed to the output shaft 1 by a spline 1a so as to rotate integrally with the output shaft 1. The input and output shafts 2 and 1 are rotatably supported by a casing via bearings 12 and 13, respectively.

Toroidal surfaces or rolling transmission surfaces 5a and 6a of the input and output disks 5 and 6 define a common arc to form a toroidal cavity. A power roller 9 transmits power while rolling in contact with the rolling transmission surfaces 5a and 6a. This power roller 9 and a bearing 8 together form a support bearing of the power roller 9. A fixing ring 14 of the bearing 8 is attached to trunnions 7 via sliding washers 15. The bearing 8 is attached to the trunnions 7 via rocking shafts 7a. The trunnions 7 are so supported as to be tiltable such that the power roller 9 can change the speed by changing its contact positions with the rolling transmission surfaces 5a and 6a in the toroidal cavity. Lubricating oil such as traction oil is supplied to lubricate the bearing 8 and also lubricate the contact surfaces between the power roller 9 and the toroidal surfaces of the input and output disks 5 and 6. A mechanism for supplying this lubricating oil is omitted from FIG. 1.

Table 1 shows chemical components, surface C and N amounts (wt %), and shot peening in examples according to the present invention and comparative examples.

Figure 2A:
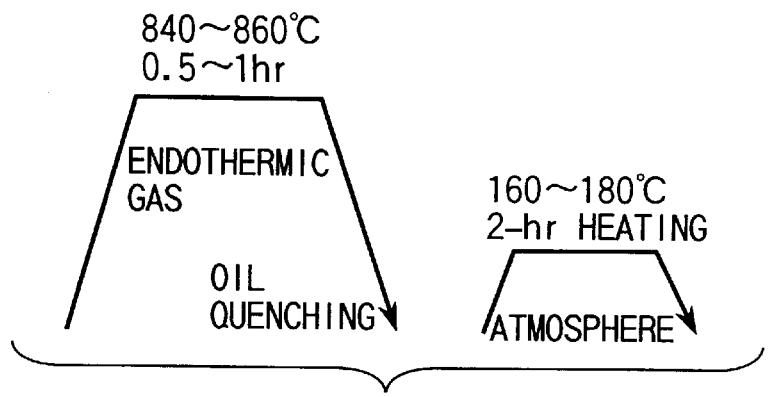
FIG. 2A is a view showing thermal history (I) of a heat treatment performed for components of the toroidal type continuously variable transmission.
Figure 2B:
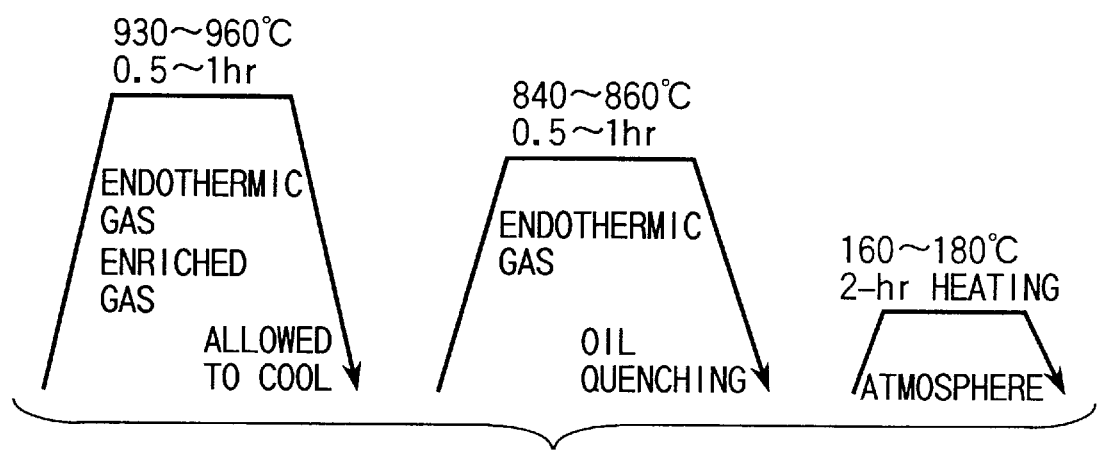
FIG. 2B is a view showing thermal history (II) of cementation performed for the components.
Figure 2C:
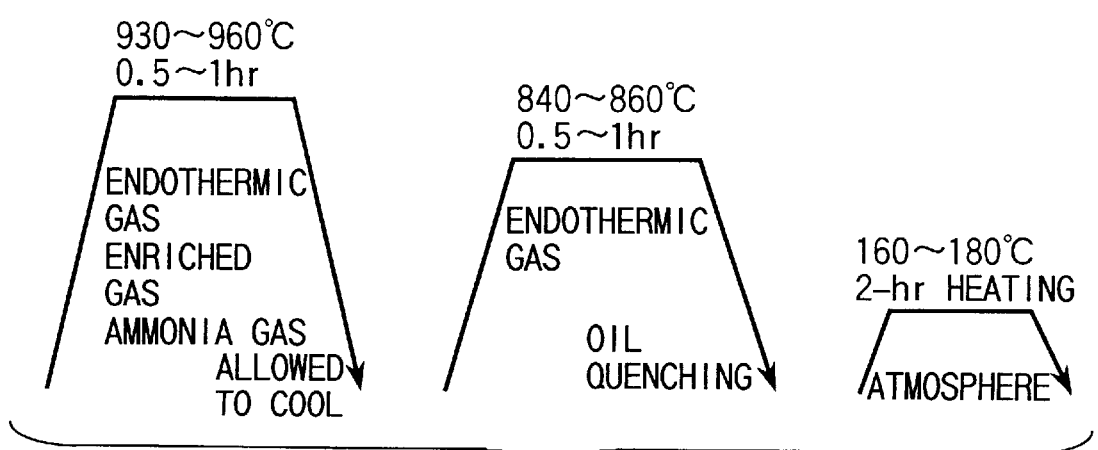
FIG. 2C is a view showing thermal history (III) of carbonitriding performed for the components.
Figure 3:
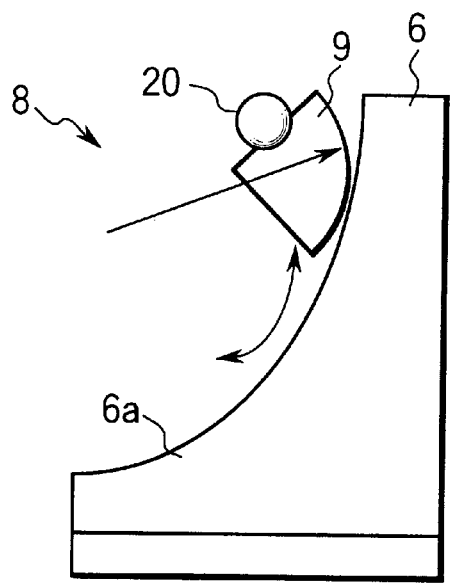
FIG. 3 is a schematic view for explaining bending stress and tangential stress acing on a disk.
Figure 4:
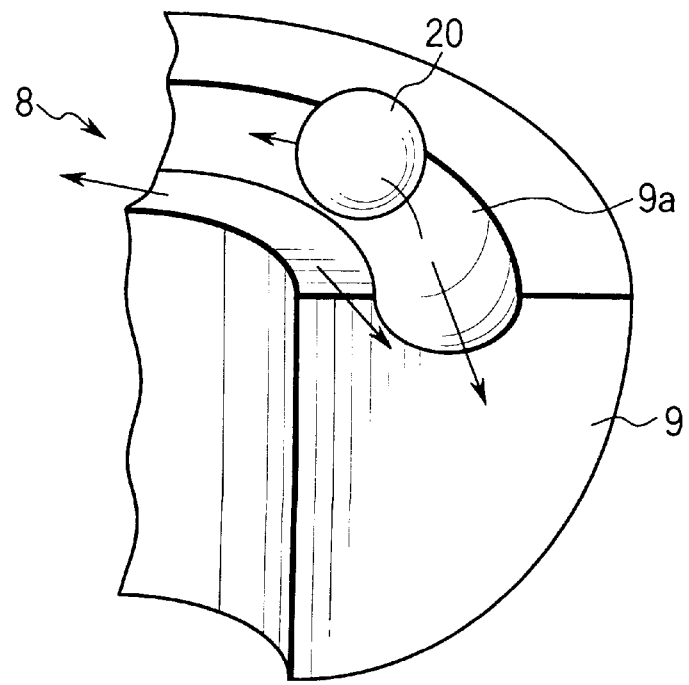
FIG. 4 is a schematic view showing bending stress and tangential stress acting on a power roller.
Figure 5:
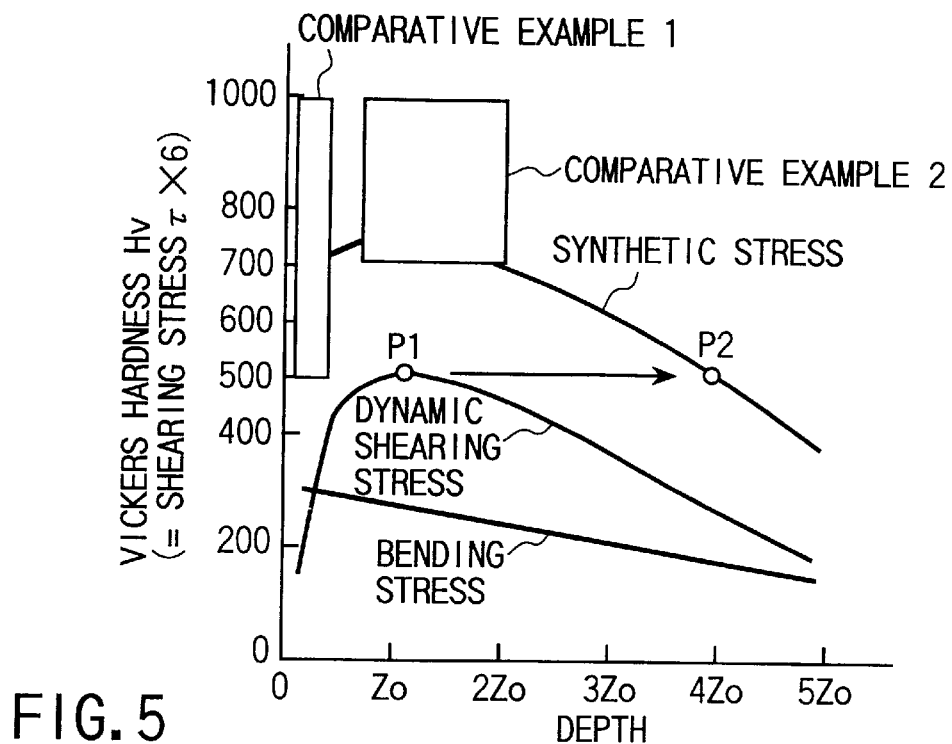
FIG. 5 is a graph showing the distribution of synthetic stress acing on the disk.
Figure 6:
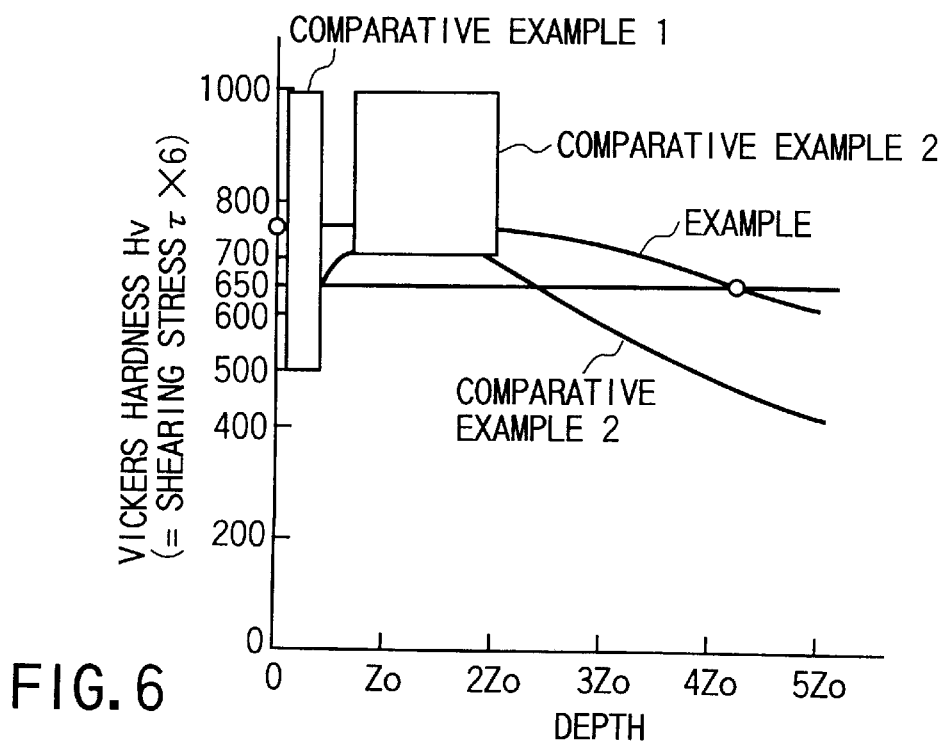
FIG. 6 is a graph showing the distribution of hardness by comparing an example with comparative examples.

The examples and comparative examples shown in Table 1 were manufactured by performing heat treatment (I) (prior art 1) under conditions shown in FIG. 2A or heat treatment (II) under conditions shown in FIG. 2B and heat treatment (III) under conditions shown in FIG. 2C (examples and comparative examples), and performing shot peening. [Heat treatment (I)]

As shown in FIG. 2A, a material was heated in an endothermic gas ambient at 840 to 860° C. for 0.5 to 1 hr and oil-quenched (hardened). The resultant material was heated in the atmosphere at 160 to 180° C. for 2 hr and cooled (tempered).

[Heat treatment (II)]

As shown in FIG. 2B, a material was heat-treated (cemented) in an endothermic gas/enriched gas ambient at 930 to 960° C. for 10 to 15 hr and allowed to cool. Subsequently, the material was heated in an endothermic gas ambient at 840 to 860° C. for 0.5 to 1 hr and oil-quenched (hardened). The resultant material was heated in the atmosphere at 160 to 180° C. for 2 hr and cooled (tempered).

[Heat treatment (III)]

As shown in FIG. 2C, a material was heat-treated (carbonitrided) in an endothermic gas/enriched gas/ ammonia gas ambient at 930 to 960° C. for 5 to 10 hr and allowed to cool. Subsequently, the material was heated in an endothermic gas ambient at 840 to 860° C. for 0.5 to 1 hr and oil-quenched (hardened). The resultant material was heated in the atmosphere at 160 to 180° C. for 2 hr and cooled (tempered).

The maximum residual stress (kgf/mm$^2$) at a depth of 0.5 Dx of each resultant power roller was measured. That is, the profile of the residual stress in the direction of depth from the rolling surface of the member was obtained, and a maximum value at the depth of 0.5 Dx was measured. The results are shown in Table 1. Note that the residual stress (kgf/mm$^2$) mentioned in the present invention indicates compression when the sign is negative (−) and tension when the sign is positive (+).

Toroidal type continuously variable transmissions were assembled by using the inner and, outer rings of power roller bearing, input disks, and output disks completed through the heat treatments by using materials having the compositions shown in Table 1. Table 1 shows the residual compression stress at 3 Zo, as an example of the range of 0.5 Dx to Dx, of each component. Also, Table 2 shows the hardness of each component at 5 Zo as an example of Dx. Note that rolling elements (balls) 20 were manufactured by heating, tempering, and polishing SUJ2.

The bearings in the examples and comparative examples thus obtained were tested under the following conditions.

[Test conditions]

| Rotational speed of input shaft: | 4,000 r.p.m. |
|---|---|
| Input torque: | 370 N.m |
| Oil: | Synthetic lubricating oil |
| Oil temperature: | 100° C. |

Under the above test conditions, the values of Zo and Dx were as follows when the maximum surface pressure was 3.9 GPa.

$$Zo = 0.48 \times 1.3 \text{ mm}$$
$$= 0.624 \text{ mm}$$
$$Dx = 3Zo \text{ to } 5Zo$$
$$= 1.87 \text{ to } 3.12 \text{ mm}$$

The life was evaluated by the time before peeling occurred in any of the power roller, outer ring, input disk, and output disk constructing each test piece (examples and comparative examples) or the time before fatigue cracking occurred in any of the power roller, outer ring, input disk, and output disk. If a rolling element peeled during the test, the test was continued by replacing the peeled rolling element with a new one. Also, the test was complete when 100 hours elapsed. The results are shown in Table 2 (time is indicated by hr).

Table 2 shows the relationship between the hardness in position Dx=5.0 Zo and the life. As is apparent from Table 2, the life greatly improved in Examples 1 to 10 when compared to Comparative Examples 1 to 10. This proves that the life improved in the examples (present invention) in each of which the power roller (inner ring), outer ring, input disk, and output disk were made of case hardening steel containing C=0.15 to 0.5 wt %, Si=0.15 to 1.5 wt %, Mo=0.1 to 1.5 wt %, and $0 \leq 9$ ppm, and subjected to shot peening after predetermined heat treatments such as carbonitriding, hardening, and tempering.

Especially in Examples 3 to 10, any of the power roller (inner ring), outer ring, input disk, and output disk neither peeled nor broke for more than 100 hr, and no fatigue cracking occurred for more than 100 hr. That is, the life greatly improved in these examples. This is so because, in each of Examples 3 to 10, all of the four components, i.e., the power roller, outer ring, input disk, and output disk had a residual stress of $-80$ kgf/mm$^2$ or more at 3 Zo as an example of the position Dx and a surface hardness of Hv740 or more. In Examples 1 and 2, the disks slightly peeled when 85 and 72 hours elapsed, respectively. It is estimated that this peeling occurred because both of the surface hardness and the hardness in the position Dx were slightly lowered. However, the service lives of Examples 1 and 2 are much longer than those of Comparative Examples 1 to 5.

By contrast, in Comparative Examples 1 to 10 in which the amounts of C, Si, Mo, and 0 fell outside the aforementioned composition ranges, fatigue cracking took place within shorter time periods than any of Examples 1 to 10. Also, in Comparative Examples 6 to 9 in which one of the surface C and N amounts fell outside the aforementioned composition range, no predetermined hardness was obtained, so the components were not strong enough against the combined stress of rolling fatigue and fatigue cracking. Consequently, the components cracked or peeled within short time periods. Furthermore, in Comparative Example 10 in which the maximum residual compression stress when 3.0 Zo=Dx was $-60$ kgf/mm$^2$ or less, the life shortened by fatigue cracking start points.

From the foregoing, to improve the life of toroidal type continuously variable transmission, it is necessary to perform carbonitriding by which Hv650 or more is obtained in the position Dx as indicated by the example when Dx=5.0 Zo was chosen, and to perform processing such as shot peening by which the residual compression stress at the depth of 0.5 Dx to Dx is $-60$ to $-130$ kgf/mm$^2$ as indicated by the example in which the residual stress was $-130$ to $-60$ kgf/mm$^2$ when 3.0 Zo=Dx. It is also preferable to use carbonitrided SUJ2 so that ball peeling does not frequently occur.

The toroidal type continuously variable transmission of the present invention can well prevent peeling and breakage of the power roller (inner ring), outer ring, input disk, and output disk. In particular, this toroidal type continuously variable transmission can well prevent even cracking occurring from, e.g., the bearing inner circumferential surface or the traction surface. Consequently, the life of the toroidal type continuously variable transmission is greatly prolonged compared to conventional transmissions.

TABLE 1

|  |  | C | Si | Mn | Cr | Mo | O (ppm) | Surface C | Surface N | SP Treatment (kgf/mm$^2$) | Heat Treatment |
|---|---|---|---|---|---|---|---|---|---|---|---|
| Examples | 1 | 0.25 | 0.35 | 0.70 | 1.00 | 0.30 | 8 | 0.80 | 0.09 | −60 | (III) |
|  | 2 | 0.15 | 0.28 | 0.70 | 1.01 | 0.15 | 9 | 0.89 | 0.13 | −60 | (III) |
|  | 3 | 0.50 | 0.15 | 0.71 | 1.00 | 0.56 | 5 | 1.08 | 0.05 | −80 | (III) |
|  | 4 | 0.33 | 1.01 | 0.70 | 1.00 | 0.22 | 6 | 1.15 | 0.06 | −80 | (III) |
|  | 5 | 0.46 | 0.59 | 0.70 | 1.00 | 1.25 | 4 | 0.98 | 0.15 | −100 | (III) |
|  | 6 | 0.20 | 1.50 | 0.71 | 1.00 | 0.46 | 7 | 0.87 | 0.11 | −100 | (III) |
|  | 7 | 0.39 | 0.78 | 0.70 | 1.00 | 0.98 | 9 | 1.06 | 0.14 | −120 | (III) |
|  | 8 | 0.31 | 0.50 | 0.70 | 1.00 | 0.41 | 8 | 1.18 | 0.08 | −120 | (III) |
|  | 9 | 0.28 | 0.44 | 0.70 | 1.00 | 0.29 | 7 | 1.20 | 0.16 | −130 | (III) |
|  | 10 | 0.19 | 0.33 | 0.69 | 1.00 | 1.50 | 9 | 1.00 | 0.20 | −130 | (III) |
| Controls | 1 | 0.98 | 0.24 | 0.70 | 1.00 | — | 9 | — | — | −60 | (I) |
|  | 2 | 0.10 | 0.15 | 0.71 | 1.00 | 0.10 | 8 | 0.93 | 0.11 | −60 | (III) |
|  | 3 | 0.36 | 0.10 | 0.70 | 1.01 | 0.12 | 8 | 0.84 | 0.18 | −65 | (III) |
|  | 4 | 0.29 | 1.34 | 0.70 | 1.00 | 0.05 | 8 | 1.01 | 0.08 | −65 | (III) |
|  | 5 | 0.45 | 0.36 | 0.70 | 1.00 | 0.98 | 16 | 0.86 | 0.16 | −65 | (III) |
|  | 6 | 0.16 | 0.86 | 0.70 | 1.01 | 0.26 | 9 | 1.02 | — | −85 | (II) |
|  | 7 | 0.23 | 0.19 | 0.70 | 1.00 | 0.11 | 8 | 1.56 | 0.09 | −85 | (III) |
|  | 8 | 0.32 | 0.29 | 0.69 | 1.00 | 0.58 | 8 | 0.62 | 0.12 | −100 | (III) |
|  | 9 | 0.41 | 0.18 | 0.70 | 1.01 | 0.13 | 9 | 0.85 | 0.35 | −100 | (III) |
|  | 10 | 0.26 | 0.30 | 0.70 | 1.00 | 0.18 | 8 | 0.83 | 0.15 | −30 | (III) |

TABLE 2

|  | Surface Hardness (Hv) | Hardness in Position Dx (Hv) | Service Life (hr) | Portion of Breakage, Cracking, or Peeling |
|---|---|---|---|---|
| Examples |  |  |  |  |
| 1 | 720 | 651 | 85 | Disk |
| 2 | 731 | 653 | 72 | Disk |
| 3 | 743 | 662 | 100 or more | None |
| 4 | 745 | 658 | 100 or more | None |
| 5 | 748 | 655 | 100 or more | None |
| 6 | 780 | 659 | 100 or more | None |
| 7 | 765 | 657 | 100 or more | None |
| 8 | 776 | 668 | 100 or more | None |
| 9 | 803 | 679 | 100 or more | None |
| 10 | 811 | 683 | 100 or more | None |
| Controls |  |  |  |  |
| 1 | 745 | 739 | 5 | Disk |
| 2 | 721 | 435 | 8 | Disk |
| 3 | 723 | 653 | 13 | Disk |

TABLE 2-continued

| | Surface Hardness (Hv) | Hardness in Position Dx (Hv) | Service Life (hr) | Portion of Breakage, Cracking, or Peeling |
|---|---|---|---|---|
| 4 | 708 | 654 | 10 | Disk |
| 5 | 721 | 650 | 39 | Disk |
| 6 | 724 | 539 | 30 | Disk |
| 7 | 745 | 561 | 29 | Disk |
| 8 | 701 | 654 | 43 | Disk |
| 9 | 743 | 487 | 38 | Disk |
| 10 | 720 | 652 | 45 | Disk |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A toroidal type continuously variable transmission comprising an input disk attached to an input shaft, an output disk attached to an output shaft, and a power roller bearing including an inner ring, an outer ring, and a plurality of rolling elements, said inner ring engaging with said input and output disks to transmit power from said input shaft to said output shaft, wherein at least one component selected from the group consisting of said inner and outer rings of said power roller bearing and said input and output disks is made of a material containing 0.15 to 0.5 wt %, 0.15 to 1.5 wt %, and 0.1 to 1.5 wt % of C, Si, and Mo, respectively, equal or not more than 9 ppm of oxygen, and said at least one component is subjected to carbonitriding, hardening, tempering and grinding, such that a finished surface C and N amounts are 0.8 to 1.2 wt % and 0.05 to 0.20 wt %, respectively, and the surface hardness has a Vickers hardness of equal or not less than Hv720, and hardness of the material at a depth of Dx from a surface is not equal to or less than Hv650, the Dx being a critical equivalent stress generation position in a synthetic stress distribution of a shearing stress distribution and a bending stress distribution and meeting Dx=3.0 Zo to 5.0 Zo where Zo is a maximum dynamic shearing stress generation position from the surface.

2. A toroidal type continuously variable transmission comprising an input disk attached to an input shaft, an output disk attached to an output shaft, and a power roller bearing including an inner ring, an outer ring, and a plurality of rolling elements, said inner ring engaging with said input and output disks to transmit power from said input shaft to said output shaft, wherein at least one component selected from the group consisting of said inner and outer rings of said power roller bearing and said input and output disks is made of a material containing 0.15 to 0.5 wt %, 0.15 to 1.5 wt %, and 0.1 to 1.5 wt % of C, Si, and Mo, respectively, equal or not more than 9 ppm of oxygen, and said at least one component is subjected to carbonitriding, hardening, tempering and grinding, such that a finished surface C and N amounts are 0.8 to 1.2 wt % and 0.05 to 0.20 wt %, respectively, and the surface hardness of the material has a Vickers hardness of not less than Hv720, and residual stress at a depth of 0.5 Dx to Dx from the surface is $-130$ to $-60$ kgf/mm$^2$, the Dx being a critical equivalent stress generation position in a synthetic stress distribution of a shearing stress distribution and a bending stress distribution and meeting Dx=3.0 Zo to 5.0 Zo where Zo is a maximum dynamic shearing stress generation position.

3. A transmission according to claim 1, wherein residual stress of said surface at a depth of 0.5 Dx to Dx is $-130$ to $-60$ kgf/mm$^2$.

* * * * *